United States Patent
Meier et al.

Patent Number: 6,140,397
Date of Patent: Oct. 31, 2000

[54] STABILIZERS AND ANTI-OZONANTS FOR ELASTOMERS

[75] Inventors: Hans-Rudolf Meier, Marly; Gerrit Knobloch, Magden; Peter Nesvadba, Marly, all of Switzerland

[73] Assignee: Ciba Specialty Chemicals Corporation, Tarrytown, N.Y.

[21] Appl. No.: 09/229,866

[22] Filed: Jan. 13, 1999

[30] Foreign Application Priority Data

Jan. 15, 1998 [CH] Switzerland .................. 68/98

[51] Int. Cl.[7] .................................................. C08K 5/15
[52] U.S. Cl. .................................................. 524/111
[58] Field of Search .............................. 524/111

[56] References Cited

U.S. PATENT DOCUMENTS

| | | | |
|---|---|---|---|
| 4,325,863 | 4/1982 | Hinsken et al. | 624/111 |
| 4,338,244 | 7/1982 | Hinsken et al. | 524/109 |
| 5,175,312 | 12/1992 | Dubs et al. | 549/307 |
| 5,216,052 | 6/1993 | Nesvadba et al. | 524/108 |
| 5,252,643 | 10/1993 | Nesvadba | 524/111 |
| 5,356,966 | 10/1994 | Nesvadba | 524/111 |
| 5,367,008 | 11/1994 | Nesvadba | 524/111 |
| 5,369,159 | 11/1994 | Nesvadba | 524/111 |
| 5,428,162 | 6/1995 | Nesvadba | 544/221 |
| 5,428,177 | 6/1995 | Nesvadba | 549/304 |
| 5,488,117 | 1/1996 | Nesvadba | 549/302 |
| 5,516,920 | 5/1996 | Nesvadba et al. | 549/307 |
| 5,814,692 | 9/1998 | Nesvadba | 524/107 |
| 5,869,565 | 2/1999 | Clauss | 524/590 |

FOREIGN PATENT DOCUMENTS

| | | |
|---|---|---|
| 0842975 | 5/1998 | European Pat. Off. . |
| 2252325 | 8/1992 | United Kingdom . |

OTHER PUBLICATIONS

Ullmann's Encyclopedia of Industrial Chemistry, 5$^{th}$ Completely Revised Edition, vol. A23, pp. 221, 225, 239, 240, 241, 365, 421, 463, (1993).

Hans–Georg Elias, An Introduction to Polymer Science, Chapter 12, pp. 388–393 (1997).

Miller et al., Rubber World, volume 200 (5), pp. 13–23, (1989).

*Primary Examiner*—Kriellion Sanders
*Attorney, Agent, or Firm*—Luther A. R. Hall

[57] ABSTRACT

Elastomers that have excellent stability towards oxidative, light- or ozone-induced degradation comprise as stabilizers at least one compound of the benzofuran-2-one type.

12 Claims, No Drawings

STABILIZERS AND ANTI-OZONANTS FOR ELASTOMERS

The present invention relates to compositions comprising an elastomer subject to oxidative, thermal, light- or ozone-induced degradation and, as stabiliser, at least one compound of the benzofuran-2-one type, and to the use thereof as colour-stable, non-discolouring stabilisers and anti-ozonants for elastomers to counteract oxidative, thermal, light- or ozone-induced degradation, and to a method of stabilising elastomers which comprises incorporating in or applying to the elastomers at least one compound of the benzofuran-2-one type.

Rubber articles (vulcanisates) are subject, like all polymers, to oxidative, thermal or light-induced degradation. A factor that is especially damaging to diene caoutchouc vulcanisates is ozone. Ozone attacks carbon-carbon double bonds, a large number of which are still present in the rubber (vulcanisate), and, as a result of the mechanism known as ozonolysis, leads to damage which is manifested by typical surface-crack formation and which results in failure of the rubber article. The damage evident when the rubber article is subjected to dynamic stress is especially serious.

To prevent ozone damage, ageing inhibitors from the class of the para-phenylene-diamines are generally added to vulcanisates [see Russel A. Mazzeo et al., "Tire Technology International" 1994, pages 36–46; or Donald E. Miller et al., Rubber World, 200 (5), 13–23 (1989)]. Those compounds have a very good protective action, especially under dynamic conditions, but develop pronounced discoloring and, as a result of high migration rates, exhibit intensive contact staining, that is to say on direct contact colourant is transferred to other substrates/articles. The stabilisers used as state of the art therefore cannot be used for carbon-black-free or "non-black" rubber articles and are also unsuitable for carbon-black-containing (black) rubber articles that are to be used in direct contact with light-coloured articles.

There is accordingly still a need for colour-stable stabilisers that protect rubber articles, especially light-coloured rubber articles, against ozone. There likewise continues to be a need for stabilisers that, even though they may become discoloured, are not capable, for example as a result of being chemically bonded to the caoutchouc chains, of transferring the colour to other articles.

The use of compounds of the benzofuran-2-one type as stabilisers for organic polymers is known, for example, from U.S. Pat. No. 4,325,863; U.S. Pat. No. 4,388,244; U.S. Pat. No. 5,175,312; U.S. Pat. No. 5,252,643; U.S. Pat. No. 5,216,052; U.S. Pat. No. 5,369,159; U.S. Pat. No. 5,488,117; U.S. Pat. No. 5,356,966; U.S. Pat. No. 5,367,008; U.S. Pat. No. 5,428,162; U.S. Pat. No. 5,428,177 or U.S. Pat. No. 5,516,920.

It has now been found that compounds of the benzofuran-2-one type are especially well suited as stabilisers for elastomers that are sensitive to oxidative, thermal, light- or ozone-induced degradation.

The present invention accordingly relates to compositions comprising a) an elastomer subject to oxidative, thermal, light- or ozone-induced degradation, and b) as stabiliser, at least one compound of the benzofuran-2-one type.

Of interest are compositions in which component (b) is a compound of formula I

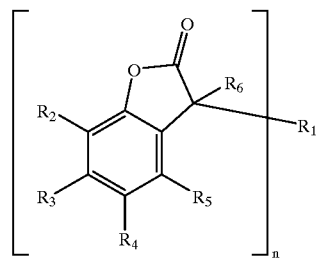

wherein, when n is 1, $R_1$ is unsubstituted or $C_1$–$C_4$alkyl-, $C_1$–$C_4$alkoxy-, $C_1$–$C_4$alkylthio-, hydroxy-, halogen-, amino-, $C_1$–$C_4$alkylamino-, phenylamino- or di($C_1$–$C_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, or $R_1$ is a radical of formula II

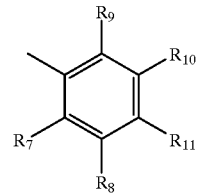

and, when n is 2, $R_1$ is unsubstituted or $C_1$–$C_4$alkyl- or hydroxy-substituted phenylene or naphthylene; or —$R_{12}$-X-$R_{13}$—, $R_2$, $R_3$, $R_4$ and $R_5$ are each independently hydrogen, chlorine, hydroxy, $C_1$–$C_{25}$alkyl, $C_7$–$C_9$phenylalkyl, unsubstituted or $C_1$–$C_4$alkyl-substituted phenyl; unsubstituted or $C_1$–$C_4$alkyl-substituted $C_5$–$C_8$cycloalkyl; $C_1$–$C_{18}$alkoxy, $C_1$–$C_{18}$alkylthio, $C_1$–$C_4$alkylamino, di($C_1$–$C_4$alkyl)amino, $C_1$–$C_{25}$alkanoyloxy, $C_1$–$C_{25}$alkanoylamino, $C_3$–$C_{25}$alkenoyloxy, $C_3$–$C_{25}$alkanoyloxy interrupted by oxygen, sulfur or by

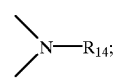

C6–C9cycloalky carbonyloxy, benzoyloxy or $C_1$–$C_{12}$alkyl-substituted benzoyloxy; or the radicals $R_2$ and $R_3$ or the radicals $R_3$ and $R_4$ or the radicals $R_4$ and $R_5$, together with the carbon atoms to which they are bonded, form a benzo ring, $R_4$ may additionally be —$(CH_2)_p$—$COR_{15}$ or —$(CH_2)_q$OH or, when $R_3$, $R_5$ and R6 are hydrogen, $R_4$ may additionally be a radical of formula III

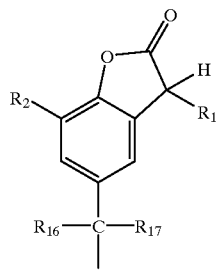

(III)

wherein $R_1$ is as defined above for n=1

$R_6$ is hydrogen or a radical of formula IV

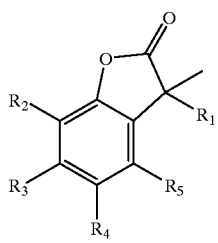

(IV)

wherein $R_4$ is not a radical of formula III and $R_1$ is as defined above for n=1, $R_7$, $R_8$, $R_9$, $R_{10}$ and $R_{11}$ are each independently hydrogen, halogen, hydroxy, $C_1$–$C_{25}$alkyl, $C_2$–$C_{25}$alkyl interrupted by oxygen, sulfur or by

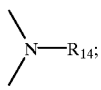

$C_1$–$C_{25}$alkoxy, $C_2$–$C_{25}$alkoxy interrupted by oxygen, sulfur or by

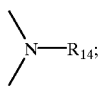

$C_1$–$C_{25}$alkoxy, $C_3$–$C_{25}$alkoxythio, $C_3$–$C_{25}$alkenyl, $C_3$–$C_{25}$alkenyloxy, $C_3$–$C_{25}$alkynyl, $C_3$–$C_{25}$alkynyloxy, $C_7$–$C_9$phenylalkyl, $C_7$–$C_9$phenylalkoxy, unsubstituted or $C_1$–$C_4$alkyl-substituted phenyl; unsubstituted or $C_1$–$C_4$alkyl-substituted phenoxy; unsubstituted or $C_1$–$C_4$alkyl-substituted $C_5$–$C_8$cycloalkyl; unsubstituted or $C_1$–$C_4$alkyl-substituted $C_5$–$C_8$cycloalkoxy; $C_1$–$C_4$alkylamino, di($C_1$–$C_4$-alkyl)amino, $C_1$–$C_{25}$alkanoyl, $C_3$–$C_{25}$alkanoyl interrupted by oxygen, sulfur or by

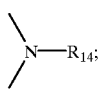

$C_1$–$C_{25}$alkanoyloxy, $C_3$–$C_{25}$alkanoyloxy interrupted by oxygen, sulfur or by

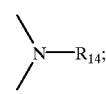

$C_1$–$C_{25}$alkanoylamino, $C_3$–$C_{25}$alkenoyl, $C_3$–$C_{25}$alkenoyl interrupted by oxygen, sulfur or by

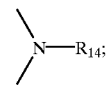

$C_3$–$C_{25}$alkenoyloxy; $C_3$–$C_{25}$alkenoyloxy interrupted by oxygen, sulfur or by

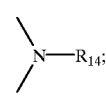

$C_6$–$C_9$cycloalkylcarbonyl, $C_6$–$C_9$cycloalkylcarbonyloxy, benzoyl or $C_1$–$C_{12}$alkyl-substituted benzoyl; benzoyloxy or $C_1$–$C_{12}$alkyl-substituted benzoyloxy;

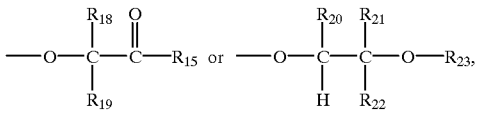

or, further, in formula 11 the radicals $R_7$ and $R_8$ or the radicals $R_8$ and $R_{11}$, together with the carbon atoms to which they are bonded, form a benzo ring, $R_{12}$ and $R_{13}$ are each independently unsubstituted or $C_1$–$C_4$alkyl-substituted phenylene or naphthylene, $R_{14}$ is hydrogen or $C_1$–$C_8$alkyl, $R_{15}$ is hydroxy,

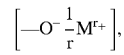

$C_1$–$C_{18}$alkoxy or

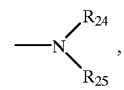

$R_{16}$ and $R_{17}$ are each independently hydrogen, $CF_3$, $C_1$–$C_{12}$alkyl or phenyl, or $R_{16}$ and $R_{17}$, together with the carbon atom to which they are bonded, form a $C_5$–$C_8$cycloalkylidene ring that is unsubstituted or substituted by from 1 to 3 $C_1$–$C_4$alkyl;

$R_{18}$ and $R_{19}$ are each independently hydrogen, $C_1$–$C_4$alkyl or phenyl, $R_{20}$ is hydrogen or $C_1$–$C_4$alkyl, $R_{21}$ is hydrogen, unsubstituted or $C_1$–$C_4$alkyl-substituted phenyl; $C_1$–$C_{25}$alkyl, $C_2$–$C_{25}$alkyl interrupted by oxygen, sulfur or by

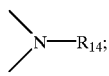

C₇–C₉phenylalkyl unsubstituted or substituted at the phenyl radical by from 1 to 3 C₁–C₄alkyl; C₇–C₂₅phenylalkyl interrupted by oxygen, sulfur or by

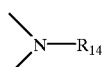

and unsubstituted or substituted at the phenyl radical by from 1 to 3 C₁–C₄alkyl; or, further, the radicals $R_{20}$ and $R_{21}$, together with the carbon atoms to which they are bonded, form a C₅–C₁₂cycloalkylene ring that is unsubstituted or substituted by from 1 to 3 C₁–C₄alkyl;

$R_{22}$ is hydrogen or C₁–C₄alkyl, $R_{23}$ is hydrogen, C₁–C₂₅alkanoyl, C₃–C₂₅alkenoyl, C₃–C₂₅alkanoyl interrupted by oxygen, sulfur or by

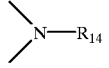

C₂–C₂₅alkanoyl substituted by a di(C₁–C₆alkyl) phosphonate group;

C₆–C₉cycloalkylcarbonyl, thenoyl, furoyl, benzoyl or C₁–C₁₂alkyl-substituted benzoyl;

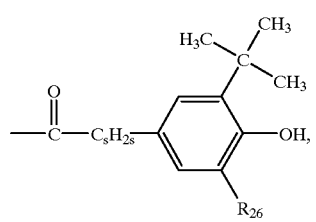

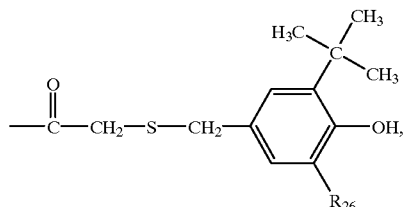

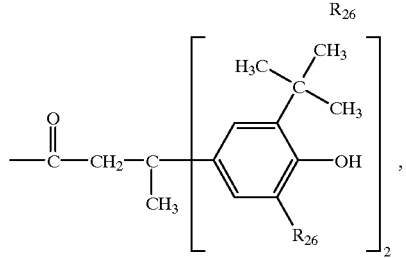

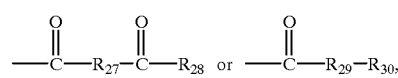

$R_{24}$ and $R_{25}$ are each independently hydrogen or C₁–C₁₈alkyl, $R_{26}$ is hydrogen or C₁–C₈alkyl, $R_{27}$ is a direct bond, C₁–C₁₈alkylene, C₂–C₁₈alkylene interrupted by oxygen, sulfur or by

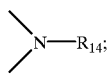

C₂–C₁₈alkenylene, C₂–C₂₀alkylidene, C₇–C₂₀phenylalkylidene, C₅–C₈cycloalkylene, C₇–C₈bicycloalkylene, unsubstituted or C₁–C₄alkyl-substituted phenylene,

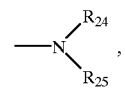

$R_{28}$ is hydroxy,

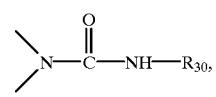

C₁–C₁₈alkoxy or

—N(R₂₄)(R₂₅) , $R_{29}$ is oxygen, —NH— or $R_{30}$ is C₁–C₁₈alkyl or phenyl, $R_{31}$ is hydrogen or C₁–C₁₈alkyl, M is an r-valent metal cation, X is a direct bond, oxygen, sulfur or —NR₃₁—, n is 1 or 2, p is 0, 1 or 2, q is 1, 2, 3, 4, 5 or 6, r is 1, 2 or 3, and s is 0, 1 or 2.

Unsubstituted or C₁–C₄alkyl-, C₁–C₄alkoxy-, C₁–C₄alkylthio-, hydroxy-, halogen-, amino-, C₁–C₄alkylamino-, phenylamino- or di(C₁–C₄-alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thiathrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl is, for example, 1-naphthyl, 2-naphthyl, 1-phenylamino-4-naphthyl, 1-methyinaphthyl, 2-methylnaphthyl, 1-methoxy-2-naphthyl, 2-methoxy-1-naphthyl, 1-dimethylamino-2-naphthyl, 1,2-dimethyl-4-naphthyl, 1,2-dimethyl-6-naphthyl, 1,2-dimethyl-7-naphthyl, 1,3-dimethyl-6-naphthyl, 1,4-dimethyl-6-naphthyl, 1,5-dimethyl-2-naphthyl, 1,6-dimethyl-2-naphthyl, 1-hydroxy-2-naphthyl, 2-hydroxy-1-naphthyl, 1,4-dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-phenoxathiinyl, 2,7-phenoxathiinyl, 2-pyrrolyl, 3-pyrrolyl, 5-methyl-3-pyrrolyl, 2-imidazolyl, 4-imidazolyl, 5-imidazolyl, 2-methyl-4-imidazolyl, 2-ethyl-4-imidazolyl, 2-ethyl-5-imidazolyl, 3-pyrazolyl, 1-methyl-3-pyrazolyl, 1-propyl-4-pyrazolyl, 2-pyrazinyl, 5,6-dimethyl-2-pyrazinyl, 2-indolizinyl, 2-methyl-3-isoindolyl, 2-methyl-1-isoindolyl, 1-methyl-2-indolyl, 1-methyl-3-indolyl, 1,5-dimethyl-2-indolyl, 1-methyl-3-indazolyl, 2,7-di-methyl-8-purinyl, 2-methoxy-7-methyl-8-purinyl, 2-quinolizinyl, 3-isoquinolyl, 6-isoquinolyl, 7-isoquinolyl, isoquinolyl, 3-methoxy-6-isoquinolyl, 2-quinolyl, 6-quinolyl, 7-quinolyl, 2-methoxy-3-quinolyl, 2-methoxy-6-quinolyl, 6-phthalazinyl, 7-phthalazinyl, 1-methoxy-6-phthalazinyl, 1,4-dimethoxy-6-phthalazinyl, 1,8-naphthyridin-2-yl, 2-quinoxalinyl, 6-quinoxalinyl, 2,3-dimethyl-6-quinoxalinyl, 2,3-dimethoxy-6-quinoxalinyl, 2-quinazolinyl, 7-quinazolinyl, 2-di-methylamino-6-quinazolinyl, 3-cinnolinyl, 6-cinnolinyl, 7-cinnolinyl, 3-methoxy-7-cinnolinyl, 2-pteridinyl, 6-pteridinyl, 7-pteridinyl, 6,7-dimethoxy-2-pteridinyl, 2-carbazolyl, 3-carbazolyl, 9-methyl-2-carbazolyl, 9-methyl-3-carbazolyl, β-carbolin-3-yl, 1-methyl-β-carbolin-3-yl, 1-methyl-β-carbolin-6-yl, 3-phenanthridinyl, 2-acridinyl, 3-acridinyl, 2-perimidinyl, 1-methyl-5-perimidinyl, 5-phenanthrolinyl, 6-phenanthrolinyl, 1-phenazinyl, 2-phenazinyl, 3-isothiazolyl, 4-isothiazolyl, 5-isothiazolyl, 2-phenothiazinyl, 3-phenothiazinyl, 10-methyl-3-phenothiazinyl, 3-isoxazolyl, 4-isoxazolyl, 5-isoxazolyl, 4-methyl-3-furazanyl, 2-phenoxazinyl or 10-methyl-2-phenoxazinyl.

Especially preferred are unsubstituted or $C_1-C_4$alkyl-, $C_1-C_4$alkoxy-, $C_1-C_4$alkylthio-, hydroxy-, phenylamino- or di($C_1-C_4$-alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]-thienyl, thiathrenyl, dibenzofuryl, chromenyl, xanthenyl, phenoxathiinyl, pyrrolyl, isoindolyl, indolyl, phenothiazinyl, biphenyl, terphenyl, fluorenyl or phenoxazinyl, such as, for example, 1-naphthyl, 2-naphthyl, 1-phenylamino-4-naphthyl, 1-methyinaphthyl, 2-methyinaphthyl, 1-methoxy-2-naphthyl, 2-methoxy-1-naphthyl, 1-dimethylamino-2-naphthyl, 1,2-dimethyl-4-naphthyl, 1,2-dimethyl-6-naphthyl, 1,2-dimethyl-7-naphthyl, 1,3-dimethyl-6-naphthyl, 1,4-di-methyl-6-naphthyl, 1,5-dimethyl-2-naphthyl, 1,6-dimethyl-2-naphthyl, 1-hydroxy-2-naphthyl, 2-hydroxy-1-naphthyl, 1,4-dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-pyrrolyl, 3-pyrrolyl, 2-phenothiazinyl, 3-phenothiazinyl and 10-methyl-3-phenothiazinyl.

Halogen is, for example, chlorine, bromine or iodine. Chlorine is preferred.

Alkanoyl having up to 25 carbon atoms is a branched or unbranched radical, such as, for example, formyl, acetyl, propionyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, eicosanoyl or docosanoyl. Preference is given to alkanoyl having from 2 to 18, especially from 2 to 12, for example from 2 to 6, carbon atoms. Acetyl is especially preferred.

$C_2-C_{25}$Alkanoyl substituted by a di($C_1-C_6$alkyl) phosphonate group is, for example, $(CH_3CH_2O)_2POCH_2CO—$, $(CH_3O)_2POCH_2CO—$, $(CH_3CH_2CH_2CH_2O)_2POCH_2CO—$, $(CH_3CH_2O)_2POCH_2CH_2CO—$, $(CH_3O)_2POCH_2CH_2CO—$, $(CH_3CH_2CH_2CH_2O)_2POCH_2CH_2CO—$, $(CH_3CH_2O)_2PO(CH_2)_4CO—$, $(CH_3CH_2O)_2PO(CH_2)_8CO—$ or $(CH_3CH_2O)_2PO(CH_2)_{17}CO—$.

Alkanoyloxy having up to 25 carbon atoms is a branched or unbranched radical, such as, for example, formyloxy, acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, eicosanoyloxy or docosanoyloxy. Preference is given to alkanoyloxy having from 2 to 18, especially from 2 to 12, for example from 2 to 6, carbon atoms. Acetoxy is especially preferred.

Alkenoyl having from 3 to 25 carbon atoms is a branched or unbranched radical, such as, for example, propenoyl, 2-butenoyl, 3-butenoyl, isobutenoyl, n-2,4-pentadienoyl, 3-methyl-2-butenoyl, n-2-octenoyl, n-2-dodecenoyl, iso-dodecenoyl, oleoyl, n-2-octadecenoyl or n-4-octadecenoyl. Preference is given to alkenoyl having from 3 to 18, especially from 3 to 12, for example from 3 to 6, more especially 3 or 4, carbon atoms.

$C_3-C_{25}$Alkenoyl interrupted by oxygen, sulfur or by

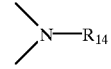

is, for example, $CH_3OCH_2CH_2CH=CHCO—$ or $CH_3OCH_2CH_2OCH=CHCO—$.

Alkenoyloxy having from 3 to 25 carbon atoms is a branched or unbranched radical, such as, for example, propenoyloxy, 2-butenoyloxy, 3-butenoyloxy, isobutenoyloxy, n-2,4-pentadienoyloxy, 3-methyl-2-butenoyloxy, n-2-octenoyloxy, n-2-dodecenoyloxy, iso-dodecenoyloxy, oleoyloxy, n-2-octadecenoyloxy or n-4-octadecenoyloxy. Preference is given to alkenoyloxy having from 3 to 18, especially from 3 to 12, for example from 3 to 6, more especially 3 or 4, carbon atoms.

$C_3-C_{25}$Alkenoyloxy interrupted by oxygen, sulfur or by

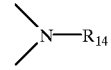

is, for example, $CH_3—OCH_2CH_2CH=CHCOO—$ or $CH_3OCH_2CH_2OCH=CHCOO—$.

$C_3-C_{25}$Alkanoyl interrupted by oxygen, sulfur or by

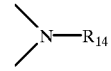

is, for example, $CH_3—O—CH_2CO—$, $CH_3—S—CH_2CO—$, $CH_3—NH—CH_2CO—$, $CH_3—N(CH_3)—CH_2CO—$, $CH_3—O—CH_2CH_2—O—CH_2CO—$, $CH_3-(O—CH_2CH_2—)_2O—CH_2CO—$, $CH_3-(O—CH_2CH_2—)_3—CH_2CO—$ or $CH_3-(O—CH_2CH_2—)_4O—CH_2CO—$.

$C_3$–$C_{25}$Alkanoyloxy interrupted by oxygen, sulfur or by

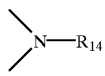

is, for example,
$CH_3$—O—$CH_2$COO—, $CH_3$—S—$CH_2$COO—, $CH_3$—NH—$CH_2$COO—, $CH_3$—N($CH_3$)—$CH_2$COO—, $CH_3$—O—$CH_2CH_2$—O—$CH_2$COO—, $CH_3$-(O—$CH_2CH_2$—$)_2$O—$CH_2$COO—, $CH_3$-(O—$CH_2CH_2$—$)_3$O—$CH_2$COO— or $CH_3$-(O—$CH_2CH_2$—$)_4$O—$CH_2$COO—.

$C_6$–$C_9$Cycloalkylcarbonyl is, for example, cyclohexylcarbonyl, cycloheptylcarbonyl or cyclooctylcarbonyl. Cyclohexylcarbonyl is preferred.

$C_6$–$C_9$Cycloalkylcarbonyloxy is, for example, cyclohexylcarbonyloxy, cycloheptylcarbonyloxy or cyclooctylcarbonyloxy. Cyclohexylcarbonyloxy is preferred.

$C_1$–$C_{12}$Alkyl-substituted benzoyl that carries preferably from 1 to 3, especially 1 or 2, alkyl groups is, for example, o-, m- or p-methylbenzoyl, 2,3-dimethylbenzoyl, 2,4-dimethylbenzoyl, 2,5-dimethylbenzoyl, 2,6-dimethylbenzoyl, 3,4-dimethylbenzoyl, 3,5-dimethylbenzoyl, 2-methyl-6-ethylbenzoyl, 4-tert-butylbenzoyl, 2-ethylbenzoyl, 2,4,6-trimethylbenzoyl, 2,6-di-methyl-4-tert-butylbenzoyl or 3,5-di-tert-butylbenzoyl. Preferred substituents are $C_1$–$C_8$alkyl, especially $C_1$–$C_4$alkyl.

$C_1$–$C_{12}$Alkyl-substituted benzoyloxy that carries preferably from 1 to 3, especially 1 or 2, alkyl groups is, for example, o-, m- or p-methylbenzoyloxy, 2,3-dimethylbenzoyloxy, 2,4-dimethylbenzoyloxy, 2,5-dimethylbenzoyloxy, 2,6-dimethylbenzoyloxy, 3,4-dimethylbenzoyloxy, 3,5-dimethylbenzoyloxy, 2-methyl-6-ethylbenzoyloxy, 4-tert-butylbenzoyloxy, 2-ethylbenzoyloxy, 2,4,6-trimethylbenzoyloxy, 2,6-dimethyl-4-tert-butylbenzoyloxy or 3,5-di-tert-butylbenzoyloxy. Preferred substituents are $C_1$–$C_8$alkyl, especially $C_1$–$C_4$alkyl.

Alkyl having up to 25 carbon atoms is a branched or unbranched radical, such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, iso-heptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_2$ and $R_4$ is, for example, $C_1$–$C_{18}$alkyl. An especially preferred meaning of $R_4$ is $C_1$–$C_4$alkyl.

Alkenyl having from 3 to 25 carbon atoms is a branched or unbranched radical, such as, for example, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having from 3 to 18, especially from 3 to 12, for example from 3 to 6, more especially 3 or 4, carbon atoms.

Alkenyloxy having from 3 to 25 carbon atoms is a branched or unbranched radical, such as, for example, propenyloxy, 2-butenyloxy, 3-butenyloxy, isobutenyloxy, n-2,4-pentadienyloxy, 3-methyl-2-butenyloxy, n-2-octenyloxy, n-2-dodecenyloxy, iso-dodecenyloxy, oleyloxy, n-2-octadecenyloxy or n-4-octadecenyloxy. Preference is given to alkenyloxy having from 3 to 18, especially from 3 to 12, for example from 3 to 6, more especially 3 or 4, carbon atoms.

Alkynyl having from 3 to 25 carbon atoms is a branched or unbranched radical, such as, for example, propynyl (—$CH_2$—C≡CH), 2-butynyl, 3-butynyl, n-2-octynyl or n-2-dodecynyl.

Preference is given to alkynyl having from 3 to 18, especially from 3 to 12, for example from 3 to 6, more especially 3 or 4, carbon atoms.

Alkynyloxy having from 3 to 25 carbon atoms is a branched or unbranched radical, such as, for example, propynyloxy (—O$CH_2$-C≡CH) 2-butynyloxy, 3-butynyloxy, n-2-octynyloxy or n-2-dodecynyloxy. Preference is given to alkynyloxy having from 3 to 18, especially from 3 to 12, for example from 3 to 6, more especially 3 or 4, carbon atoms.

$C_2$–$C_{25}$Alkyl interrupted by oxygen, sulfur or by

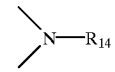

is, for example, $CH_3$—O—$CH_2$—,
$CH_3$—S—$CH_2$—, $CH_3$—NH—$CH_2$—, $CH_3$—N($CH_3$)—$CH_2$—, $CH_3$—O—$CH_2CH_2$—O—$CH_2$—, $CH_3$-(O—$CH_2CH_2$—$)_2$O—$CH_2$—, $CH_3$-(O—$CH_2CH_2$—$)_3$O—$CH_2$— or $CH_3$-(O—$CH_2CH_2$—$)_4$O—$CH_2$—.

$C_7$–$C_9$Phenylalkyl is, for example, benzyl, α-methylbenzyl, α,α-dimethylbenzyl or 2-phenyl-ethyl. Benzyl and α,α-dimethylbenzyl are preferred.

$C_7$–$C_9$Phenylalkyl unsubstituted or substituted at the phenyl radical by from 1 to 3 $C_1$–$C_4$alkyl is, for example, benzyl, α-methylbenzyl, α,α-dimethylbenzyl, 2-phenylethyl, 2-methylbenzyl, 3-methylbenzyl, 4-methylbenzyl, 2,4-dimethylbenzyl, 2,6-dimethylbenzyl or 4-tert-butylbenzyl. Benzyl is preferred.

$C_7$–$C_{25}$Phenylalkyl interrupted by oxygen, sulfur or by

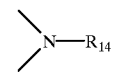

and unsubstituted or substituted at the phenyl radical by from 1 to 3 $C_1$–$C_4$alkyl is a branched or unbranched radical, such as, for example, phenoxymethyl, 2-methyl-phenoxymethyl, 3-methyl-phenoxymethyl, 4-methyl-phenoxymethyl, 2,4-dimethyl-phenoxymethyl, 2,3-dimethyl-phenoxymethyl, phenylthiomethyl, N-methyl-N-phenyl-methyl, N-ethyl-N-phenyl-methyl, 4-tert-butyl-phenoxymethyl, 4-tert-butyl-phenoxyethoxy-methyl, 2,4-di-tert-butyl-phenoxymethyl, 2,4-di-tert-butylphenoxyethoxymethyl, phenoxyethoxyethoxyethoxymethyl, benzyloxymethyl, benzyloxyethoxymethyl, N-benzyl-N-ethyl-methyl or N-benzyl-N-isopropyl-methyl.

$C_7$–$C_9$Phenylalkoxy is, for example, benzyloxy, α-methylbenzyloxy, α,α-dimethylbenzyloxy or 2-phenylethoxy. Benzyloxy is preferred.

$C_1$–$C_4$Alkyl-substituted phenyl that contains preferably from 1 to 3, especially 1 or 2, alkyl groups is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_1$–$C_4$Alkyl-substituted phenoxy that contains preferably from 1 to 3, especially 1 or 2, alkyl groups is, for example, o-, m- or p-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-methyl-6-ethylphenoxy, 4-tert-butylphenoxy, 2-ethylphenoxy or 2,6-diethylphenoxy.

Unsubstituted or $C_1$–$C_4$alkyl-substituted $C_5$–$C_8$cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. Cyclohexyl and tert-butylcyclohexyl are preferred.

Unsubstituted or $C_1$–$C_4$alkyl-substituted $C_5$–$C_8$cycloalkoxy is, for example, cyclopentyloxy, methylcyclopentyloxy, dimethylcyclopentyloxy, cyclohexyloxy, methylcyclohexyloxy, dimethylcyclohexyloxy, trimethylcyclohexyloxy, tert-butylcyclohexyloxy, cycloheptyloxy or cyclooctyloxy. Cyclohexyloxy and tert-butylcyclohexyloxy are preferred.

Alkoxy having up to 25 carbon atoms is a branched or unbranched radical, such as, for example, methoxy, ethoxy, propoxy, isopropoxy, n-butoxy, isobutoxy, pentyloxy, isopentyloxy, hexyloxy, heptyloxy, octyloxy, decyloxy, tetradecyloxy, hexadecyloxy or octadecyloxy. Preference is given to alkoxy having from 1 to 12, especially from 1 to 8, for example from 1 to 6, carbon atoms.

$C_2$–$C_25$Alkoxy interrupted by oxygen, sulfur or by

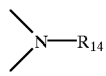

is, for example,
$CH_3$—O—$CH_2CH_2$O—, $CH_3$—S—$CH_2CH_2$O—, $CH_3$—NH—$CH_2CH_2$O—, $CH_3$—N($CH_3$)—$CH_2CH_2$O—, $CH_3$—$CH_2CH_2$—O—$CH_2CH_2$O—, $CH_3$-(O—$CH_2$$CH_2$—)$_2$O—$CH_2CH_2$O—, $CH_3$-(O—$CH_2CH_2$—)$_3$O—$CH_2$$CH_2$O— or $CH_3$-(O—$CH_2CH_2$—)$_4$O—$CH_2CH_2$O—.

Alkylthio having up to 25 carbon atoms is a branched or unbranched radical, such as, for example, methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio. Preference is given to alkylthio having from 1 to 12, especially from 1 to 8, for example from 1 to 6, carbon atoms.

Alkylamino having up to 4 carbon atoms is a branched or unbranched radical, such as, for example, methylamino, ethylamino, propylamino, isopropylamino, n-butylamino, isobutylamino or tert-butylamino.

Di($C_1$–$C_4$-alkyl)amino denotes also that the two radicals, independently of one another, are branched or unbranched, such as, for example, dimethylamino, methylethylamino, diethylamino, methyl-n-propylamino, methylisopropylamino, methyl-n-butylamino, methylisobutylamino, ethylisopropylamino, ethyl-n-butylamino, ethylisobutylamino, ethyl-tert-butylamino, diethylamino, diisopropylamino, isopropyl-n-butylamino, isopropylisobutylamino, di-n-butylamino or di-isobutylamino.

Alkanoylamino having up to 25 carbon atoms is a branched or unbranched radical, such as, for example, formylamino, acetylamino, propionylamino, butanoylamino, pentanoylamino, hexanoylamino, heptanoylamino, octanoylamino, nonanoylamino, decanoylamino, undecanoylamino, dodecanoylamino, tridecanoylamino, tetradecanoylamino, pentadecanoylamino, hexadecanoylamino, heptadecanoylamino, octadecanoylamino, eicosanoylamino or docosanoylamino. Preference is given to alkanoylamino having from 2 to 18, especially from 2 to 12, for example from 2 to 6, carbon atoms.

$C_1$–$C_{18}$Alkylene is a branched or unbranched radical, such as, for example, methylene, ethylene, propylene, trimethylene, tetramethylene, pentamethylene, hexamethylene, heptamethylene, octamethylene, decamethylene, dodecamethylene or octadecamethylene. $C_1$–$C_{12}$Alkylene, especially $C_1$–$C_8$alkylene, is preferred.

A $C_1$–$C_4$alkyl-substituted $C_5$–$C_{12}$cycloalkylene ring that contains preferably from 1 to 3, especially 1 or 2, branched or unbranched alkyl groups is, for example, cyclopentylene, methylcyclopentylene, dimethylcyclopentylene, cyclohexylene, methylcyclohexylene, dimethylcyclohexylene, trimethylcyclohexylene, tert-butylcyclohexylene, cycloheptylene, cyclooctylene or cyclodecylene. Cyclohexylene and tert-butylcyclohexylene are preferred.

$C_2$–$C_{18}$Alkylene interrupted by oxygen, sulfur or by

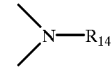

is, for example,
—$CH_2$—O—$CH_2$—, —$CH_2$—S—$CH_2$—, —$CH_2$—NH—$CH_2$—, —$CH_2$—N($CH_3$)—$CH_2$—, —$CH_2$—O—$CH_2CH_2$—O—$CH_2$—, —$CH_2$-(O—$CH_2CH_2$—)$_2$O—$CH_2$—, —$CH_2$-(O—$CH_2CH_2$—)$_3$O—$CH_2$—, —$CH_2$-(O—$CH_2CH_2$—)$_4$O—$CH_2$— or —$CH_2CH_2$—S—$CH_2CH_2$—.

$C_2$–$C_{18}$Alkenylene is, for example, vinylene, methylvinylene, octenylethylene or dodecenylethylene. $C_2$–$C_8$Alkenylene is preferred.

Alkylidene having from 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. $C_2$–$C_8$Alkylidene is preferred.

Phenylalkylidene having from 7 to 20 carbon atoms is, for example, benzylidene, 2-phenylethylidene or 1-phenyl-2-hexylidene. $C_7$–$C_9$Phenylalkylidene is preferred.

$C_5$–$C_8$Cycloalkylene is a saturated hydrocarbon group having two free valencies and at least one ring unit and is, for example, cyclopentylene, cyclohexylene, cycloheptylene or cyclooctylene. Cyclohexylene is preferred.

$C_7$–$C_8$Bicycloalkylene is, for example, bicycloheptylene or bicyclooctylene.

Unsubstituted or $C_1$–$C_4$alkyl-substituted phenylene or naphthylene is, for example, 1,2-, 1,3- or 1,4-phenylene, or 1,2-, 1,3-, 1,4-, 1,6-, 1,7-, 2,6- or 2,7-naphthylene. 1,4-Phenylene is preferred.

A $C_1$–$C_4$alkyl-substituted $C_5$–$C_8$cycloalkylidene ring that contains preferably from 1 to 3, especially 1 or 2, branched or unbranched alkyl groups is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene or cyclooctylidene. Cyclohexylidene and tert-butylcyclohexylidene are preferred.

A mono-, di- or tri-valent metal cation is preferably an alkali metal, alkaline earth metal or aluminium cation, for example $Na^+$, $K^+$, $Mg^{++}$, $Ca^{++}$ or $Al^{+++}$.

Of interest are compositions comprising as component (b) at least one compound of formula I wherein, when n is 1, $R_1$ is phenyl that is unsubstituted or substituted in the para-position by $C_1$–$C_{18}$alkylthio, di($C_1$–$C_4$alkyl)amino, $C_2$–$C_8$alkanoyloxy or by —$CH_2CH_2OR_{23}$; mono- to penta-substituted alkylphenyl having altogether a maximum total of 18 carbon atoms in the from 1 to 5 alkyl substituents; unsubstituted or $C_1$–$C_4$alkyl-, $C_1$–$C_4$alkoxy-, $C_1$–$C_4$alkylthio-, hydroxy- or amino-substituted naphthyl, biphenyl, terphenyl, phenanthryl, anthryl, fluorenyl, carbazolyl, thienyl, pyrrolyl, phenothiazinyl or 5,6,7,8-tetrahydronaphthyl, and $R_{23}$ is $C_2$–$C_{18}$alkanoyl.

Preference is given to compositions comprising as component (b) at least one compound of formula I wherein, when n is 2, $R_1$ is —$R_{12}$-X-$R_{13}$—, $R_{12}$ and $R_{13}$ are phenylene, X is oxygen or —$NR_{31}$—, and $R_{31}$ is $C_1$–$C_4$alkyl.

Preference is given also to compositions comprising as component (b) at least one compound of formula I wherein, when n is 1, $R_1$ is unsubstituted or $C_1$–$C_4$alkyl-, $C_1$–$C_4$alkoxy-, $C_1$–$C_4$alkylthio-, hydroxy-, halogen-, amino-, $C_1$–$C_4$alkylamino- or di($C_1$–$C_4$-alkyl)amino-substituted naphthyl, phenanthryl, thienyl, dibenzofuryl, carbazolyl or fluorenyl or a radical of formula II

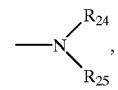

(II)

$R_7$, $R_8$, $R_9$, $R_{10}$ and $R_{11}$ are each independently hydrogen, chlorine, bromine, hydroxy, $C_1$–$C_{18}$alkyl, $C_2$–$C_{18}$alkyl interrupted by oxygen or sulfur; $C_1$–$C_{18}$alkoxy, $C_2$–$C_{18}$alkoxy interrupted by oxygen or sulfur; $C_1$–$C_{18}$alkylthio, $C_3$–$C_{12}$alkenyloxy, $C_3$–$C_{12}$alkynyloxy, $C_7$–$C_9$phenylalkyl, $C_7$–$C_9$phenylalkoxy, unsubstituted or $C_1$–$C_4$alkyl-substituted phenyl; phenoxy, cyclohexy, $C_5$–$C_8$cycloalkoxy, $C_1$–$C_4$alkylamino, di($C_1$–$C_4$alkyl) amino, $C_1$–$C_{12}$alkanoyl; $C_{13}$–$C_{12}$alkanoyl interrupted by oxygen or sulfur; $C_1$–$C_{12}$alkanoyloxy, $C_{13}$–$C_{12}$alkanoyloxy interrupted by oxygen or sulfur; $C_1$–$C_{12}$alkanoylamino, $C_3$–$C_{12}$alkenoyl, $C_3$–$C_{12}$alkenoyloxy, cyclohexylcarbonyl, cyclohexylcarbonyloxy, benzoyl or $C_1$–$C_4$alkyl-substituted benzoyl; benzoyloxy or $C_1$–$C_4$alkyl-substituted benzoyloxy;

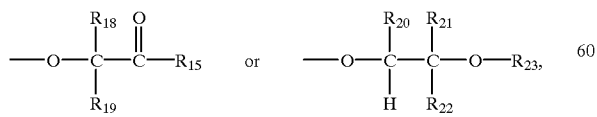

or further, in formula 11 the radicals $R_7$ and $R_8$ or the radicals $R_8$ and $R_{11}$, together with the carbon atoms to which they are bonded, form a benzo ring, $R_{15}$ is hydroxy, $C_1$–$C_{12}$alkoxy or

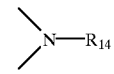

$R_{18}$ and $R_{19}$ are each independently hydrogen or $C_1$–$C_4$alkyl, $R_{20}$ is hydrogen, $R_{21}$ is hydrogen, phenyl, $C_1$–$C_{18}$alkyl, $C_2$–$C_{18}$alkyl interrupted by oxygen or sulfur; $C_7$–$C_9$-phenylalkyl, $C_7$–$C_{18}$phenylalkyl interrupted by oxygen or sulfur and unsubstituted or substituted at the phenyl radical by from 1 to 3 $C_1$–$C_4$alkyl; or, further, the radicals $R_{20}$ and $R_{21}$, together with the carbon atoms to which they are bonded, form a cyclohexylene ring that is unsubstituted or substituted by from 1 to 3 $C_1$–$C_4$alkyl, $R_{22}$ is hydrogen or $C_1$–$C_4$alkyl, $R_{23}$ is hydrogen, $C_1$–$C_{18}$alkanoyl, $C_3$–$C_{18}$alkenoyl, $C_3$–$Cl_2$alkanoyl interrupted by oxygen or sulfur; $C_2$–$C_{12}$alkanoyl substituted by a di($C_1$–$C_6$alkyl) phosphonate group; $C_6$–$C_9$cycloalkylcarbonyl benzoyl,

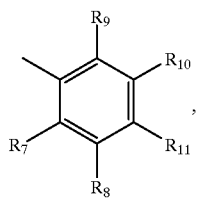

$R_{24}$ and $R_{25}$ are each independently hydrogen or $C_1$–$C_{12}$alkyl, $R_{26}$ is hydrogen or $C_1$–$C_4$alkyl, $R_{27}$ is $C_1$–$C_{12}$alkylene, $C_2$–$C_8$alkenylene, $C_2$-$C_8$alkylidene, $C_7$–$C_{12}$phenylalkylidene, $C_5$–$C_8$cycloalkylene or phenylene, $R_{28}$ is hydroxy, $C_1$–$C_{12}$alkoxy or

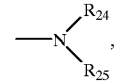

$R_{29}$ is oxygen or —NH—, $R_{30}$ is $C_1$–$C_{18}$alkyl or phenyl, and s is 1 or 2.

Preference is given also to compositions comprising as component (b) at least one compound of formula I wherein, when n is 1, $R_1$ is phenanthryl, thienyl, dibenzofuryl, unsubstituted or $C_1$–$C_4$alkyl-substituted carbazolyl; or fluorenyl; or $R_1$ is a radical of formula II

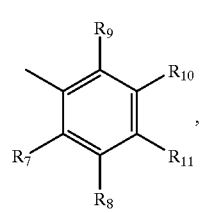

(II)

$R_7$, $R_8$, $R_9$, $R_{10}$ and $R_{11}$ are each independently hydrogen, chlorine, hydroxy, $C_1$–$C_{18}$alkyl, $C_1$–$C_{18}$alkoxy, $C_1$–$C_{18}$alkylthio, $C_3$–$C_4$alkenyloxy, $C_3$–$C_4$alkynyloxy, phenyl, benzoyl, benzoyloxy or

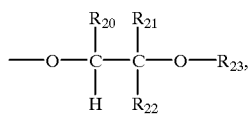

$R_{20}$ is hydrogen, $R_{21}$ is hydrogen, phenyl or $C_1$–$C_{18}$alkyl or, further, the radicals $R_{20}$ and $R_{21}$, together with the carbon atoms to which they are bonded, form a cyclohexylene ring that is unsubstituted or substituted by from 1 to 3 $C_1$–$C_4$alkyl, $R_{22}$ is hydrogen or $C_1$–$C_4$alkyl, and $R_{23}$ is hydrogen, $C_1$–$C_{12}$alkanoyl or benzoyl.

Special preference is given to compositions comprising as component (b) at least one compound of formula I wherein, when n is 1, $R_7$, $R_8$, $R_9$, $R_{10}$ and $R_{11}$, are each independently hydrogen, $C_1$–$C_{12}$alkyl, $C_1$–$C_4$alkylthio or phenyl.

Of special interest are compositions comprising as component (b) at least one compound of formula I wherein $R_2$, $R_3$, $R_4$ and $R_5$ are each independently hydrogen, chlorine, $C_1$–$C_{18}$alkyl, benzyl, phenyl, $C_5$–$C_8$cycloalkyl, $C_1$–$C_{18}$alkoxy, $C_1$–$C_{18}$alkylthio, $C_1$–$C_{18}$alkanoyloxy, $C_1$–$C_{18}$alkanoylamino, $C_3$–$C_{18}$alkenoyloxy or benzoyloxy; or, further, the radicals $R_2$ and $R_3$ or the radicals $R_3$ and $R_4$ or the radicals $R_4$ and $R_5$, together with the carbon atoms to which they are bonded, form a benzo ring, $R_4$ may additionally be —$(CH_2)_p$-$COR_{15}$ or —$(CH_2)_q$OH or, when $R_3$, $R_5$ and $R_6$ are hydrogen, $R_4$ may additionally be a radical of formula III, $R_{15}$ is hydroxy, $C_1$–$C_{12}$alkoxy or

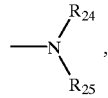

$R_{16}$ and $R_{17}$ are methyl groups or, together with the carbon atom to which they are bonded, form a $C_5$–$C_8$cycloalkylidene ring that is unsubstituted or substituted by from 1 to 3 $C_1$–$C_4$alkyl, $R_{24}$ and $R_{25}$ are each independently hydrogen or $C_1$–$C_{12}$alkyl, p is 1 or 2, and q is 2, 3, 4, 5 or 6.

Also of special interest are compositions comprising as component (b) at least one compound of formula I wherein at least two of the radicals $R_2$, $R_3$, $R_4$ and $R_5$ are hydrogen.

Particularly of special interest are compositions comprising as component (b) at least one compound of formula I wherein $R_3$ and $R_5$ are hydrogen.

More particularly of special interest are compositions comprising as component (b) at least one compound of formula I wherein $R_2$ is $C_1$–$C_{18}$alkyl, $R_3$ is hydrogen, $R_4$ is $C_1$–$C_4$alkyl or, when $R_6$ is hydrogen, $R_4$ may additionally be a radical of formula III, $R_5$ is hydrogen and $R_{16}$ and $R_{17}$, together with the carbon atom to which they are bonded, form a cyclohexylidene ring.

The following compounds are examples of the benzofuran-2-one type that are especially well suited as component (b) in the composition according to the invention: 3-[4-(2-acetoxyethoxy)phenyl]-5,7-di-tert-butyl-benzofuran-2-one; 5,7-di-tert-butyl-3-[4-(2-stearoyloxyethoxy)phenyl]-benzofuran-2-one; 3,3'-bis[5,7-di-tert-butyl-3-(4-[2-hydroxyethoxy]phenyl)-benzofuran-2-one]; 5,7-di-tert-butyl-3-(4-ethoxyphenyl)benzofuran-2-one; 3-(4-acetoxy-3,5-dimethylphenyl)-5,7-di-tert-butyl-benzofuran-2-one; 3-(3,5-dimethyl-4-pivaloyloxy-phenyl)-5,7-di-tert-butyl-benzofuran-2-one; 5,7-di-tert-butyl-3-phenyl-benzofuran-2-one; 5,7-di-tert-butyl-3-(3,4)-dimethylphenyl)-benzofuran-2-one; 5,7-di-tert-butyl-3-(2,3-dimethylphenyl)-benzofuran-2-one; 5,7-di-tert-butyl-3-(2,3,4,5,6-pentamethyl)-benzofuran-2-one; 5-methyl-7-(octadec-2-yl)-3-(3,4-dimethylphenyl)-benzofuran-2-one; 5-methyl-7-(octadec-2-yl)-3-(2,3-dimethylphenyl)-benzofuran-2-one; 5-tert-butyl-7-(octadec-2-yl)-3-(3,4-dimethylphenyl)-benzofuran-2-one; 5-tert-butyl-7-(octadec-2-yl)-3-(2,3-dimethylphenyl)-benzofuran-2-one and the compound of formula Vc

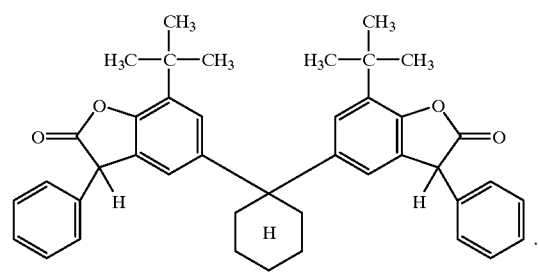

Also particularly of special interest are compositions comprising as component (b) at least one compound of formula V

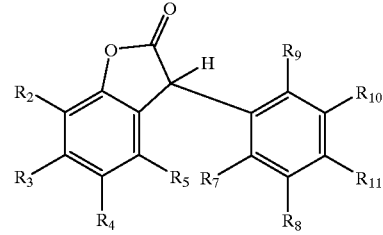

wherein $R_2$ is hydrogen or $C_1$–$C_{18}$alkyl, $R_3$ is hydrogen, $R_4$ is hydrogen, $C_1$–$C_6$alkyl or a radical of formula IIIa

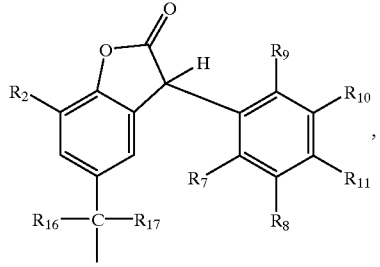

$R_5$ is hydrogen, $R_7$, $R_8$, $R_9$ and $R_{10}$ are each independently hydrogen, $C_1$–$C_4$alkyl or $C_1$–$C_4$alkoxy, $R_{11}$, is hydrogen, $C_1$–$C_4$alkyl, $C_1$–$C_4$alkoxy, $C_2$–$C_8$alkanoyloxy or

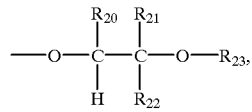

with the proviso that at least two of the radicals $R_7$, $R_8$, $R_9$, $R_{10}$ and $R_{11}$ are hydrogen;

$R_{16}$ and $R_{17}$, together with the carbon atom to which they are bonded, form a cyclohexylidene ring that is unsubstituted or substituted by from 1 to 3 $C_1$–$C_4$alkyl, $R_{20}$, $R_{21}$ and $R_{22}$ are hydrogen, and $R_{23}$ is $C_2$–$C_{18}$alkanoyl.

Preference is given more especially to compositions comprising as component (b) at least one compound of formula V

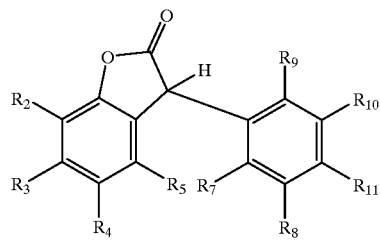

wherein $R_2$ is $C_4$–$C_{18}$alkyl, $R_3$ is hydrogen, $R_4$ is $C_1$–$C_4$alkyl or a radical of formula IIIa

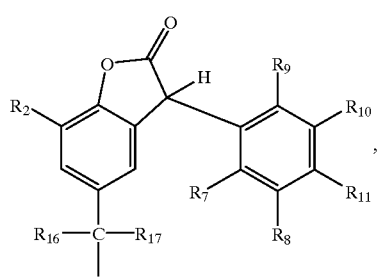

$R_5$ is hydrogen, $R_7$, $R_8$, $R_9$ and $R_{10}$ are each independently hydrogen, $C_1$–$C_4$alkyl or $C_1$–$C_4$alkoxy, $R_{11}$ is hydrogen, $C_1$–$C_4$alkyl, $C_1$–$C_4$alkoxy, $C_2$–$C_8$alkanoyloxy or

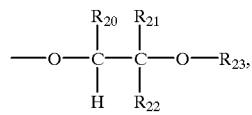

with the proviso that at least two of the radicals $R_7$, $R_8$, $R_9$, $R_{10}$ and $R_{11}$ are hydrogen;

$R_{16}$ and $R_{17}$, together with the carbon atom to which they are bonded, form a cyclohexylidene ring, $R_{20}$, $R_{21}$ and $R_{22}$ are hydrogen, and $R_{23}$ is $C_2$–$C_{18}$alkanoyl.

Of very special interest are compositions comprising as component (b) at least one compound of formula V

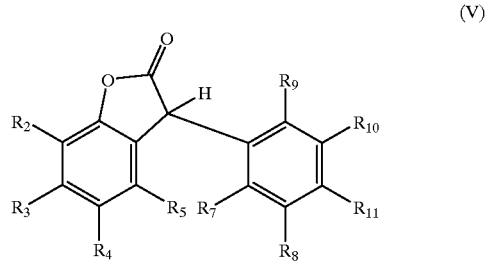

wherein $R_2$ is $C_4$–$C_{18}$alkyl, $R_3$ is hydrogen, $R_4$ is $C_1$–$C_4$alkyl, $R_5$ is hydrogen, and $R_7$, $R_8$, $R_9$, $R_{10}$ and $R_{11}$ are each independently hydrogen or $C_1$–$C_4$alkyl, with the proviso that at least two of the radicals $R_7$, $R_8$, $R_9$, $R_{10}$ and $R_{11}$ are hydrogen.

The compounds of the benzofuran-2-one type as component (b) in the composition according to the invention are known from the literature and their preparation is described, for example, in the following U.S. patent specifications: U.S. Pat. No. 4,325,863; U.S. Pat. No. 4,388,244; U.S. Pat. No. 5,175,312; U.S. Pat. No. 5,252,643; U.S. Pat. No. 5,216,052; U.S. Pat. No. 5,369,159; U.S. Pat. No. 5,488,117; U.S. Pat. No. 5,356,966; U.S. Pat. No. 5,367,008; U.S. Pat. No. 5,428,162; U.S. Pat. No. 5,428,177 or U.S. Pat. No. 5,516,920.

Component (b) is suitable for the stabilisation of elastomers, especially light-coloured elastomers, against oxidative, thermal, light- or ozone-induced degradation.

"Elastomers" are to be understood as being macromolecular materials that at room temperature, after considerable deformation caused a small degree of stress, are capable of rapidly reassuming approximately their original shape. See also Hans-Georg Elias, "An Introduction to Polymer Science", chapter 12, "Elastomers", pages 388–393, 1997, VCH Verlagsgesellschaft mbH, Weinheim, Germany; or Ullmann's Encyclopedia of Industrial Chemistry, Fifth, Completely Revised Edition, Volume A 23", pages 221–440 (1993).

The compositions according to the invention may comprise as elastomers, for example, the following materials:

1. Polymers of diolefins, such as polybutadiene or polyisoprene.

2. Copolymers of mono- and diolefins with each other or with other vinyl monomers, such as propylenelisobutylene copolymers, propylene/butadiene copolymers, isobutylene/isoprene copolymers, ethylene/alkylacrylate copolymers, ethylene/alkylmethacrylate copolymers, ethylene/vinyl acetate copolymers, acrylonitrile/butadiene copolymers and terpolymers of ethylene with propylene and a diene, such as hexadiene, dicyclopentadiene or ethylidenenorbornene.

3. Copolymers of styrene or α-methylstyrene with dienes or acryl derivatives, for example styrene/butadiene, styrene/butadiene/alkylacrylate and styrene/butadiene/methacrylate; and also block copolymers of styrene, such as styrene/butadiene/styrene or styrene/isoprene/styrene.

4. Halogen-containing polymers, for example polychloroprene, chlorinated rubber, chlorinated and bromated copolymer of isobutylene/isoprene (halobutyl rubber).

5. Natural rubber.

6. Aqueous emulsions of natural or synthetic rubbers, such as natural rubber latex or latices of carboxylated styrene/butadiene copolymers.

The elastomers to be protected are preferably vulcanised elastomers. Special preference is given to polydiene vulcanisates or halogen-containing polydiene vulcanisates, especially styrene/butadiene copolymer vulcanisates.

Component (b) is added to the elastomer to be stabilised advantageously in an amount of from 0.2 to 10%, for example from 0.5 to 5%, preferably from 0.8 to 3.0%, based on the weight of the elastomer to be stabilised.

In addition to components (a) and (b) the compositions according to the invention may additionally comprise further additives, such as, for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroguinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methyl-phenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)

oxamide, 3-thiaundecanol, 3-thiapentadecanol, trimethylhexanediol, trimethylolpropane, 4-hydroxymethyl-1-phospha-2,6,7-trioxabicyclo[2.2.]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)-propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyidiphenylamines, 2,3-dihydro-3,3-dimethyl-4H-1,4-benzothiazine, phenothiazine, a mixture of mono- und dialkylated tert-butyl/-tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

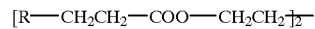

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyhenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butyl-phenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz-[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-di-benz[d,g]-1,3,2-dioxaphosphocin, 2,2',2"-nitrilo [triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate or compounds of the formula I'

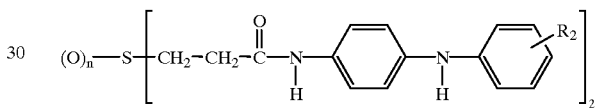

wherein
$R_1$ is hydrogen, $C_1$–$C_{12}$alkyl, cyclohexyl, phenyl or benzyl,
$R_2$ is hydrogen or $C_1$–$C_4$alkyl, and
n is 0, 1 or 2.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

11. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example, plasticisers, lubricants, emulsifiers, pigments, rheology additives, catalysts, flow-control agents, dispersants, flameproofing agents, optical brighteners, antistatic agents, blowing agents, vulcanisation activators, vulcanisation accelerators, vulcanising agents, charge control agents.

Preferred compositions according to the invention additionally comprise as further additives one or more components from the group consisting of pigments, dyes, fillers, flow control agents, dispersion auxiliaries, plasticisers, vulcanisation activators, vulcanisation accelerators, vulcanising agents, charge control agents, adhesion improvers, light stabilisers or antioxidants, such as, for example, phenolic antioxidants (points 1.1 to 1.18 of the list) or aminic antioxidants (point 1.19 of the list), organic phosphites or phosphonites (point 4 of the list) and/or thiosynergists (point 7 of the list).

The additional additives are added, for example, in concentrations of from 0.01 to 10%, based on the total weight of the light-coloured elastomer to be stabilised.

The incorporation of component (b) and, if desired, further additives, in the elastomer is effected according to known methods, for example before or during shaping or vulcanisation, or alternatively by applying component (b) in dissolved or dispersed form to the elastomer, where appropriate with subsequent evaporation of the solvent. Component (b) and, if desired, further additives, may also be added to the elastomer to be stabilised in the form of a master batch in which they are present, for example, in a concentration of from 2.5 to 25% by weight.

Component (b) and, if desired, further additives, may be added also before or during the polymerisation of synthetic elastomers or before crosslinking.

Component (b) and, if desired, further additives, may be incorporated into the elastomer to be stabilised either in pure form or encapsulated in waxes, oils or polymers.

Component (b) and, if desired, further additives, may also be applied to the elastomer to be stabilised by means of spraying. They are capable of diluting other additives (for example the above-mentioned conventional additives) or melts thereof, so that they can be sprayed together with those additives onto the light-coloured elastomer to be stabilised. Addition by spraying during the deactivation of the polymerisation catalysts is of particular advantage, it being possible, for example, for the vapour used for the deactivation to be used for the spraying.

The elastomers so stabilised may be used in a wide variety of forms, for example in the form of elastic bands, moulding materials, profile sections, conveyor belts or tires.

The present invention relates also to a method of stabilising elastomers against oxidative, thermal or light-induced degradation which comprises incorporating in or applying to those elastomers at least one component (b).

The present invention relates especially preferably to a method of protecting elastomers against ozone-induced degradation, which comprises incorporating in or applying to those elastomers at least one component (b).

A preferred embodiment of the present invention is the use of component (b) as a stabiliser for elastomers to counteract oxidative, thermal or light-induced degradation.

An especially preferred embodiment of the present invention is the use of component (b) as an anti-ozonant for elastomers to counteract ozone-induced degradation.

The following Examples illustrate the invention further. Parts or percentages refer to weight.

EXAMPLE 1

Stabilisation of light-coloured SBR-vulcanisate (ozone atmosphere for 48 hours).

100 parts by weight of Cariflex®S-1502 (styrene/butadiene rubber, Shell) are processed at 60° C., in a mixing mill, with 30.0 parts by weight of Kronos®CL 220 [titanium dioxide (pigment), Kronos Titan GmbH], 30.0 parts by weight of Aktisil®M [kaolin (filler), Hoffmann Mineral, Neuburg/Donau], 5.0 parts by weight of Naftolen®N 401 [plasticiser, Metaligesellschaft], 10.0 parts by weight of zinc oxide [vulcanisation activator], 2.0 parts by weight of stearic acid [vulcanisation activator], 2.0 parts by weight of sulfur [vulcanising agent], 1.0 part by weight of Vulkacit®MOZ [vulcanisation accelerator, Bayer], 0.25 part by weight of Vulkacit®Thiuram [vulcanisation accelerator, Bayer] and 1.0 part by weight of the stabiliser to be tested according to Table 1, to form a homogeneous mixture, the vulcanisation system (sulfur, Vulkacit®MOZ and Vulkacit®Thiuram) not being added until the end of the mixing process. The mixture is vulcanised in electrical vulcanisation presses at 150° C. until T95 is reached in the rheometer curves to form elastomer plates 2 mm thick, 21 cm long and 8.0 cm wide.

Some of the elastomer plates so obtained are tested for the action of ozone according to the ASTM standard D 3395-86 while subject to dynamic elongation. In this test, the plates are first stored for 30 days in a standard atmosphere [23/50 SN-ISO 291]. Test specimens measuring 20 cm by 1 cm are then punched out and exposed to an ozone atmosphere for 48 hours (ozone content: 50 pphm; temperature: 40° C.; humidity: 50% rel.; elongation: 0 to 25%; elongation rate: 0.5 Hz; number of load cycles: approximately 173 000). The test plates are then assessed for crack formation according to ASTM D 3395-86. Grade 0 denotes no cracks; grade 1 denotes narrow flat cracks; grade 2 denotes moderately broad, moderately deep cracks, clearly visible; grade 3 denotes broad and deep cracks. The lower the grade number, the better the stabilisation of the elastomer plates. The results are compiled in Table 1.

The remaining elastomer plates are stored for 3 weeks at room temperature in a standard laboratory atmosphere in diffuse daylight. The ΔL-colour of those plates is then determined according to DIN 6167, which corresponds to a scale of from 0 to 100. No discolouration is indicated by a value of 100. The results are compiled in Table 1.

TABLE 1

| Examples | Stabiliser | Crack formation according to ASTM D 3395-86 | ΔL-colour according to DIN 6167 |
|---|---|---|---|
| Example 1a[a)] | — | grade 1–2 | 94 |
| Example 1b[a)] | 1.0 phr[c)] Vulkanox ®4010[d)] | grade 0 | 69 |
| Example 1c[b)] | 1.0 phr[c)] compound 101[e)] | grade 0–1 | 95 |

Explanations of the footnotes [a)] to [e)] are given at the end of Table 2 (Example 2).

EXAMPLE 2

Stabilisation of light-coloured SBR-vulcanisate (ozone atmosphere for 96 hours).

100 parts by weight of Cariflex®S-1502 (styrene/butadiene rubber, Shell) are processed at 60° C., in a mixing mill, with 30.0 parts by weight of Kronos®CL 220 [titanium dioxide (pigment), Kronos Titan GmbH], 30.0 parts by weight of Aktisil®MM [kaolin (filler), Hoffmann Mineral, Neuburg/Donau], 5.0 parts by weight of Naftolen®N 401 [plasticiser, Metaligesellschaft], 10.0 parts by weight of zinc oxide [vulcanisation activator], 2.0 parts by weight of stearic acid [vulcanisation activator], 2.0 parts by weight of sulfur [vulcanising agent], 1.0 part by weight of Vulkacit®MOZ [vulcanisation accelerator, Bayer], 0.25 part by weight of Vulkacit®Thiuram [vulcanisation accelerator, Bayer] and 1.0 part by weight of the stabiliser to be tested according to Table 2, to form a homogeneous mixture, the vulcanisation system (sulfur, Vulkacit®MOZ and Vulkacit®Thiuram) not being added until the end of the mixing process. The mixture is vulcanised in electrical vulcanisation presses at 150° C. until T95 is reached in the rheometer curves to form elastomer plates 2 mm thick, 21 cm long and 8.0 cm wide.

Some of the elastomer plates so obtained are tested for the action of ozone according to the ASTM standard D 3395-86 while subject to dynamic elongation. In this test the plates are first stored for 30 days in a standard atmosphere [23/50 SN-ISO 291]. Test specimens measuring 20 cm by 1 cm are then punched out and exposed to an ozone atmosphere for 96 hours (ozone content: 50 pphm; temperature: 40° C.; humidity: 50% rel.; elongation: 0 to 25%; elongation rate: 0.5 Hz; number of load cycles: approximately 173 000). The test plates are then assessed for crack formation according to ASTM D 3395-86. Grade 0 denotes no cracks; grade 1 denotes narrow flat cracks; grade 2 denotes moderately broad, moderately deep cracks, clearly visible; grade 3 denotes broad and deep cracks. The lower the grade number, the better the stabilisation of the elastomer plates. The results are compiled in Table 2.

The remaining elastomer plates are stored for 3 weeks at room temperature in a standard laboratory atmosphere in diffuse daylight. The ΔL-colour of those plates is then determined according to DIN 6167, which corresponds to a scale of from 0 to 100. No discolouration is indicated by a value of 100. The results are compiled in Table 2.

TABLE 2

| Examples | Stabiliser | Crack formation according to ASTM D 3395-86 | ΔL-colour according to DIN 6167 |
|---|---|---|---|
| Example 2a[a] | — | grade 2 | 97 |
| Example 2b[a] | 2.0 phr[c] Vulkanox ® 4010[d] | grade 0 | 55 |
| Example 2c[b] | 2.0 phr[c] compound 102[f] | grade 1 | 95 |
| Example 2d[b] | 2.0 phr[c] compound 103[g] | grade 1 | 96 |
| Example 2e[b] | 2.0 phr[c] compound 104[h] | grade 1 | 96 |

[a]Comparison Examples.
[b]Examples according to the invention.
[c]phr denotes "parts per hundred of rubber"
[d]Vulkanox ® 4010 (Bayer) denotes 4-isopropylamino-diphenylamine of formula A (A)

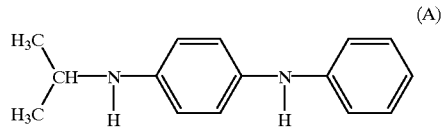

[e]Compound 101 is commercially available under the name Irganox ® HP-136 (Ciba Spezialitätenchemie AG) and is a mixture of about 85 parts by weight of the compound of formula Va and about 15 parts by weight of the compound of formula Vb.

TABLE 2-continued (Va)

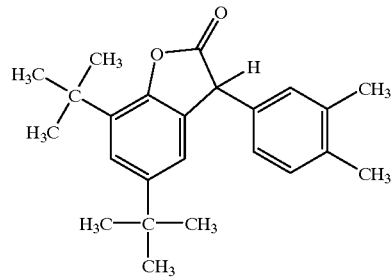

(Vb)

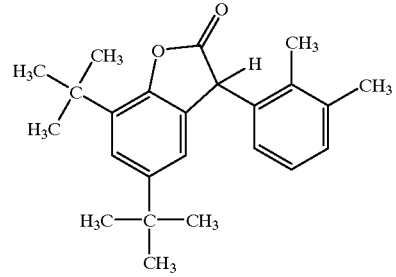

[f]Compound 102 denotes a mixture of about 6 parts by weight of the compound of formula Vd and about 1 part of weight of the compound of formula Ve.

(Vd)

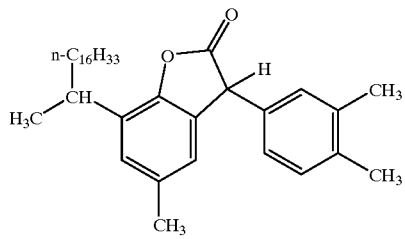

(Ve)

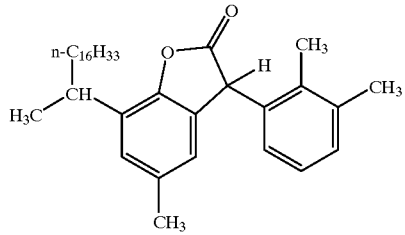

[g]Compound 103 denotes a compound of formula Vf (Vf)

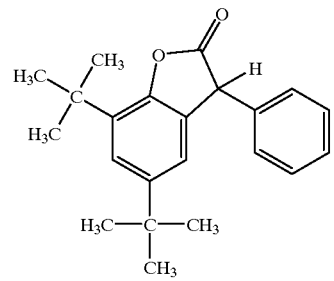

[h]Compound 104 denotes a mixture of about 6 parts by weight of the compound of formula Vg and about 1 part by weight of the compound of formula Vh.

TABLE 2-continued (Vg)

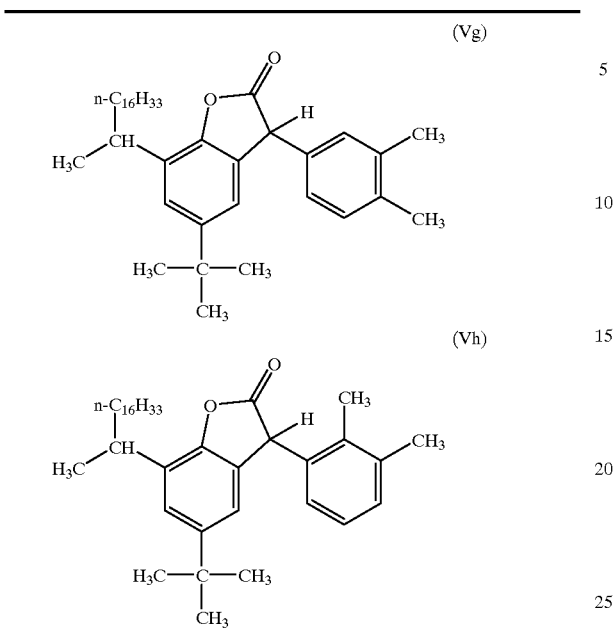

(Vh)

What is claimed is:

1. A composition comprising
   a) a light-colored polydiene vulcanisate or a light-colored halogen-containing polydiene vulcanisate subject to oxidative, thermal light- or ozone-induced degradation, and
   b) as stabiliser, at least one compound of the benzofuran-2-one type.

2. A composition according to claim 1, wherein component (b) is a compound of formula I

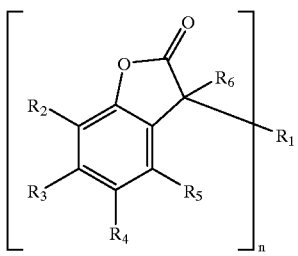

(I)

wherein, when n is 1,
$R_1$ is unsubstituted or $C_1$–$C_4$alkyl-, $C_1$–$C_4$alkoxy-, $C_1$–$C_4$alkylthio-, hydroxy-, halogen-, amino-, $C_1$–$C_4$alkylamino-, phenylamino- or di($C_1$–$C_4$alkyl) amino-substituted naphthyl, phenanthryl, anthryl, 5,6, 7,8-tetrahydro-2-naphthyl, 5,6,7,8-tetrahydro-1-naphthyl, thienyl, benzo[b]thienyl, naphtho[2,3-b] thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyt, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, or $R_1$ is a radical of formula II

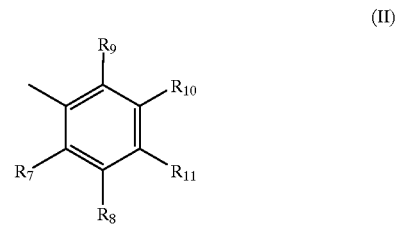

(II)

and, when n is 2,
$R_1$ is unsubstituted or $C_1$–$C_4$alkyl- or hydroxy-substituted phenylene or naphthylene; or —$R_{12}$-X-$R_{13}$—,
$R_2$, $R_3$, $R_4$ and $R_5$ are each independently hydrogen, chlorine, hydroxy, $C_1$–$C_{25}$alkyl, $C_7$–$C_9$phenylalkyl, unsubstituted or $C_1$–$C_4$alkyl-substituted phenyl; unsubstituted or $C_1$–$C_4$alkyl-substituted $C_5$–$C_8$cycloalkyl; $C_1$–$C_{18}$alkoxy, $C_1$–$C_{18}$alkylthio, $C_1$–$C_4$alkylamino, di($C_1$–$C_4$alkyl)-amino, $C_1$–$C_{25}$alkanoyloxy, $C_1$–$C_{25}$alkanoylamino, $C_3$–$C_{25}$alkenoyloxy, $C_3$–$C_{25}$alkanoyloxy interrupted by oxygen, sulfur or by

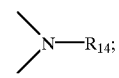

$C_6$–$C_9$cycloalkylcarbonyloxy, benzoyloxy or $C_1$–$C_{12}$alkyl-substituted benzoyloxy; or the radicals $R_2$ and $R_3$ or the radicals $R_3$ and $R_4$ or the radicals $R_4$ and $R_5$, together with the carbon atoms to which they are bonded, form a benzo ring, $R_4$ may additionally be —(CH$_2$)$_p$-COR$_{15}$ or —(CH$_2$)$_q$OH or, when $R_3$, $R_5$ and $R_6$ are hydrogen, $R_4$ may additionally be a radical of formula III

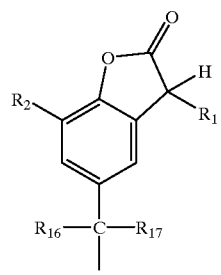

(III)

wherein $R_1$ is as defined above for n=1,

R₆ is hydrogen or a radical of formula IV

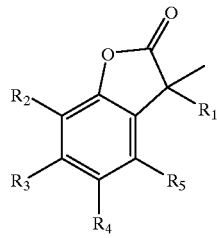
(IV)

wherein R₄ is not a radical of formula III and R₁ is as defined above for n =1,

R₇, R₈, R₉, R₁₀ and R₁₁ are each independently hydrogen, halogen, hydroxy, C₁–C₂₅alkyl, C₂–C₂₅alkyl interrupted by oxygen, sulfur or by

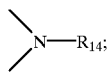

C₁–C₂₅alkoxy, C₂–C₂₅alkoxy interrupted by oxygen, sulfur or by

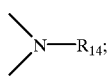

C₁–C₂₅alkylthio, C₃–C₂₅alkenyl, C₃–C₂₅-alkenyloxy, C₃–C₂₅alkynyl, C₃–C₂₅alkynyloxy, C₇–C₉phenylalkyl, C₇–C₉phenylalkoxy, unsubstituted or C₁–C₄alkyl-substituted phenyl; unsubstituted or C₁–C₄alkyl-substituted phenoxy; unsubstituted or C₁–C₄alkyl-substituted C₅–C₈cycloalkyl; unsubstituted or C₁–C₄alkyl-substituted C₅–C₈cycloalkoxy; C₁–C₄alkylamino, di(C₁–C₄-alkyl)amino, C₁–C₂₅alkanoyl, C₃–C₂₅-alkanoyl interrupted by oxygen, sulfur or by

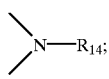

C₁–C₂₅alkanoyloxy, C₃–C₂₅alkanoyloxy interrupted by oxygen, sulfur or by

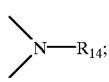

C₁–C₂₅alkanoylamino, C₃–C₂₅alkenoyl, C₃–C₂₅alkenoyl interrupted by oxygen, sulfur or by

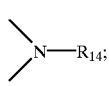

C₃–C₂₅alkenoxyloxy; C₃–C₂₅-alkenoxyloxy interrupted by oxygen, sulfur or by

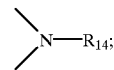

C₆–C₉cycloalkylcarbonyl, C₆–C₉cycloalkylcarbonyloxy, benzoyl or C₁–C₁₂alkyl-substituted benzoyl; benzoyloxy or C₁–C₁₂alkyl-substituted benzoyloxy;

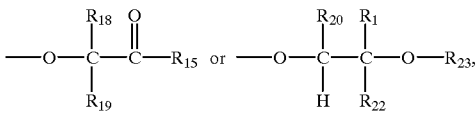

or, further, in formula 11 the radicals R₇ and R₈ or the radicals R₈ and R₁₁, together with the carbon atoms to which they are bonded, form a benzo ring, R₁₂ and R₁₃ are each independently unsubstituted or C₁–C₄alkyl-substituted phenylene or naphthylene, R₁₄ is hydrogen or C₁–C₈alkyl, R₁₅ is hydroxy,

C₁–C₁₈alkoxy or

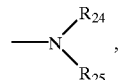

R₁₆ and R₁₇ are each independently hydrogen, CF₃, C₁–C₁₂alkyl or phenyl, or R₁₆ and R₁₇, together with the carbon atom to which they are bonded, form a C₅–C₈cycloalkylidene ring that is unsubstituted or substituted by from 1 to 3 C₁–C₄alkyl;

R₁₈ and R₁₉ are each independently hydrogen, C₁–C₄alkyl or phenyl,

R₂₀ is hydrogen or C₁–C₄alkyl,

R₂₁ is hydrogen, unsubstituted or C₁–C₄alkyl-substituted phenyl; C₁–C₂₅alkyl, C₂–C₂₅alkyl interrupted by oxygen, sulfur or by

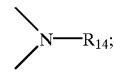

C₇–C₉phenylalkyl unsubstituted or substituted at the phenyl radical by from 1 to 3 C₁–C₄alkyl; C₇–C₂₅phenylalkyl interrupted by oxygen, sulfur or by

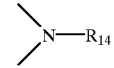

and unsubstituted or substituted at the phenyl radical by from 1 to 3 C₁–C₄alkyl; or, further, the radicals R₂₀ and R₂₁, together with the carbon atoms to which they are bonded, form a C₅–C₁₂cycloalkylene ring that is unsubstituted or substituted by from 1 to 3 C₁–C₄alkyl;

R₂₂ is hydrogen or C₁–C₄alkyl,

R₂₃ is hydrogen, C₁–C₂₅alkanoyl, C₃–C₂₅alkenoyl, C₃–C₂₅alkanoyl interrupted by oxygen, sulfur or by

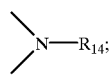

$C_2$–$C_{25}$alkanoyl substituted by a di($C_1$–$C_6$alkyl) phosphonate group;

$C_6$–$C_9$cycloalkylcarbonyl, thenoyl, furoyl, benzoyl or $C_1$–$C_{12}$alkyl-substituted benzoyl;

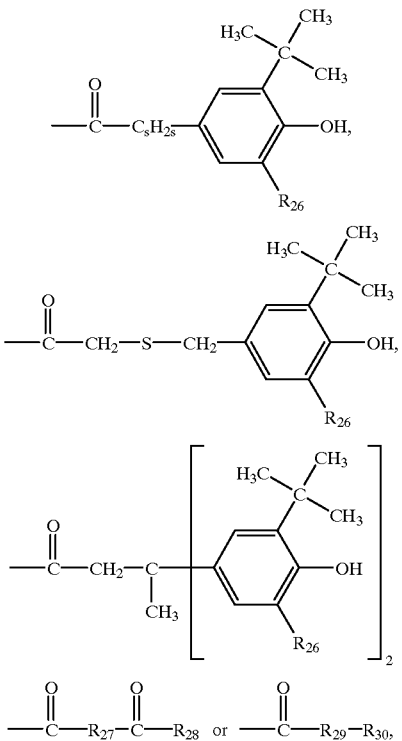

$R_{24}$ and $R_{25}$ are each independently hydrogen or $C_1$–$C_{18}$alkyl, $R_{26}$ is hydrogen or $C_1$–$C_8$alkyl, $R_{27}$ is a direct bond, $C_1$–$C_{18}$alkylene, $C_2$–$C_{18}$alkylene interrupted by oxygen, sulfur or by

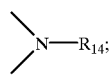

$R_2$–$C_{18}$alkenylene, $C_2$–$C_{20}$alkylidene, $C_7$–$C_{20}$phenylalkylidene, $C_5$–$C_8$cycloalkylene, $C_7$–$C_8$bicycloalkylene, unsubstituted or $C_1$–$C_4$alkyl-substituted phenylene,

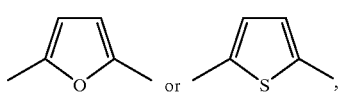

$R_{28}$ is hydroxy

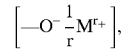

$C_1$–$C_{18}$alkoxy or

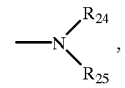

$R_{29}$ is oxygen, —NH— or

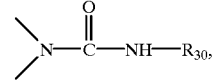

$R_{30}$ is $C_1$–$C_{18}$alkyl or phenyl, $R_{31}$ is hydrogen or $C_1$–$C_{18}$alkyl, M is an r-valent metal cation, X is a direct bond, oxygen, sulfur or —$NR_{31}$—, n is 1 or 2, p is 0, 1 or 2, q is 1, 2, 3, 4, 5 or 6, r is 1, 2 or 3, and s is 0, 1 or 2.

3. A composition according to claim 1, wherein component (b) is a compound of formula V

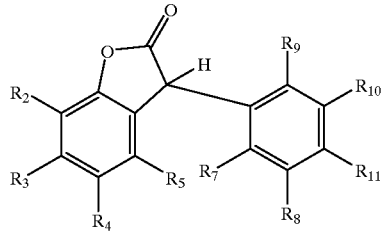

(V)

wherein $R_2$ is hydrogen or $C_1$–$C_{18}$alkyl, $R_3$ is hydrogen, $R_4$ is hydrogen, $C_1$–$C_6$alkyl or a radical of formula IIIa

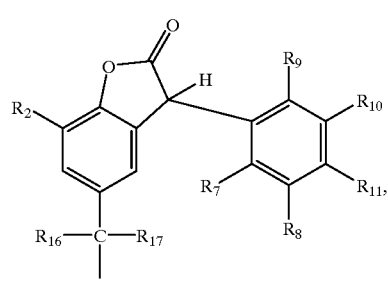

(IIIa)

$R_5$ is hydrogen, $R_7$, $R_8$, $R_9$ and $R_{10}$ are each independently hydrogen, $C_1$–$C_4$alkyl or $C_1$–$C_4$alkoxy, $R_{11}$ is hydrogen, $C_1-C_4$alkyl, $C_1-C_4$alkoxy, $C_2-C_8$alkanoyloxy or

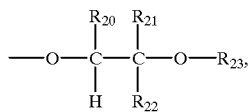

with the proviso that at least two of the radicals $R_7$, $R_8$, $R_9$, $R_{10}$ and $R_{11}$ are hydrogen;

$R_{16}$ and $R_{17}$, together with the carbon atom to which they are bonded, form a cyclohexylidene ring that is unsubstituted or substituted by from 1 to 3 $C_1-C_4$alkyl, $R_{20}$, $R_{21}$, and $R_{22}$ are hydrogen, and $R_{23}$ is $C_2-C_{18}$alkanoyl.

4. A composition according to claim 1, wherein component (b) is a compound of formula V

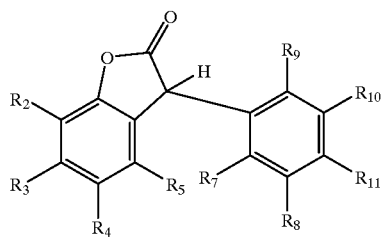

wherein $R_2$ is $C_4-C_{18}$alkyl, $R_3$ is hydrogen, $R_4$ is $C_1-C_4$alkyl or a radical of formula IIIa

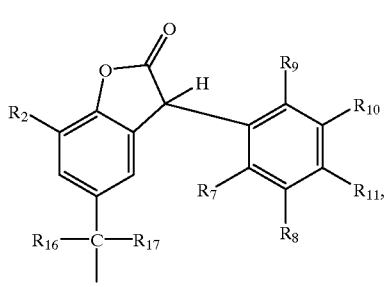

$R_5$ is hydrogen, $R_7$, $R_8$, $R_9$ and $R_{10}$ are each independently hydrogen, $C_1-C_4$alkyl or $C_1-C_4$alkoxy, $R_{11}$, is hydrogen, $C_1-C_4$alkyl, $C_1-C_4$alkoxy, $C_2-C_8$alkanoyloxy or

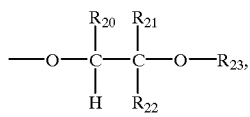

with the proviso that at least two of the radicals $R_7$, $R_8$, $R_9$, $R_{10}$ and $R_{11}$ are hydrogen;

$R_{16}$ and $R_{17}$, together with the carbon atom to which they are bonded, form a cyclohexylidene ring, $R_{20}$, $R_{21}$ and $R_{22}$ are hydrogen, and $R_{23}$ is $C_2-C_{18}$alkanoyl.

5. A composition according to claim 1, wherein component (b) is a compound of formula V

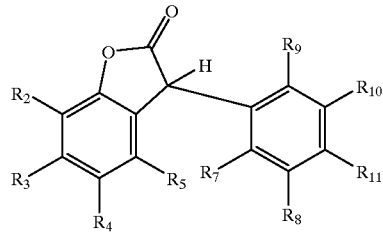

wherein $R_2$ is $C_4-C_{18}$alkyl, $R_3$ is hydrogen, $R_4$ is $C_1-C_4$alkyl, $R_5$ is hydrogen, and $R_7$, $R_8$, $R_9$, $R_{10}$ and $R_{11}$ are each independently hydrogen or $C_1-C_4$alkyl, with the proviso that at least two of the radicals $R_7$, $R_8$, $R_9$, $R_{10}$ and $R_{11}$ are hydrogen.

6. A composition according to claim 1, wherein component (a) is a light-colored styrene/butadiene copolymer vulcanisate.

7. A composition according to claim 1, comprising additionally further additives in addition to components (a) and (b).

8. A composition according to claim 7, comprising additionally as further additives one or more components from the group of pigments, dyes, fillers, flow control agents, dispersion auxiliaries, plasticisers, vulcanisation activators, vulcanisation accelerators, vulcanising agents, charge control agents, adhesion improvers, antioxidants or light stabilisers.

9. A composition according to claim 7, comprising as further additives phenolic anti-oxidants, aminic antioxidants, organic phosphites or phosphonites and/or thiosynergists.

10. A composition according to claim 1, wherein component (b) is present in an amount of from 0.2 to 10% based on the weight of component (a).

11. A method of stabilising light-colored polydiene vulcanisates or light-colored halogen-containing polydiene vulcanisates against oxidative, thermal or light-induced degradation, which comprises incorporating in or applying to those materials at least one compound of component (b) according to claim 1.

12. A method of protecting light-colored polydiene vulcanisates or light-colored halogen-containing polydiene vulcanisates against ozone-induced degradation, which comprises incorporating in or applying to those materials at least one compound of component (b) according to claim 1.

* * * * *